United States Patent [19]

Suzuki

[11] Patent Number: 5,006,886
[45] Date of Patent: Apr. 9, 1991

[54] PHOTOGRAPHIC PRINTER

[75] Inventor: Kenji Suzuki, Kanagawa, Japan

[73] Assignee: Fuji Photo Film Co., Ltd., Kanagawa, Japan

[21] Appl. No.: 511,138

[22] Filed: Apr. 19, 1990

[30] Foreign Application Priority Data

Apr. 20, 1989 [JP] Japan .................................. 1-100963

[51] Int. Cl.⁵ ............................................ G03B 27/44
[52] U.S. Cl. ...................................... 355/46; 355/35; 355/38; 355/43
[58] Field of Search ....................... 355/43, 45, 35, 38, 355/46, 55

[56] References Cited

U.S. PATENT DOCUMENTS

| | | | |
|---|---|---|---|
| 3,497,611 | 2/1970 | Orthmann et al. | 355/38 |
| 4,668,082 | 5/1987 | Terashita et al. | 355/38 |
| 4,676,628 | 6/1987 | Asbury | 355/38 |
| 4,786,944 | 11/1988 | Sakamoto et al. | |
| 4,797,713 | 1/1989 | Terashita et al. | |
| 4,816,874 | 3/1989 | Terashita et al. | 355/38 |
| 4,821,073 | 4/1989 | Backus et al. | 355/38 |
| 4,933,773 | 6/1990 | Shiota et al. | 355/45 |

FOREIGN PATENT DOCUMENTS 1324026  3/1963  France.

Primary Examiner—Monroe H. Hayes
Attorney, Agent, or Firm—Sughrue, Mion, Zinn Macpeak & Seas

[57] ABSTRACT

A photographic printer has a zoom lens for printing an image on a photographic film whose frame size is equal to or smaller than 135-size, and also has a beam splitter fitted to the zoom lens. The beam splitter reflects a part of the light passing through the image and directs it toward image sensors for measuring light so as to determine the color correction value and/or inspect the image. The printer also has an interchangeable fixed focus lens for a special print to which the zoom lens is not applicable. When using the fixed focus lens, a movable mirror is used instead of the beam splitter to reflect light toward the image sensors before printing.

11 Claims, 2 Drawing Sheets

PHOTOGRAPHIC PRINTER

BACKGROUND OF THE INVENTION

The present invention relates to a photographic printer, and more particularly to a photographic printer having a photometric device for measuring the density of an image to be printed and/or an imaging device for displaying the image on a monitor.

In order to control print exposure and color balance, and/or to inspect an image to be printed, all or a part of the light passing through the image recorded on a photographic film such as a color negative film usually is detected by at least a sensor, before being used for exposing a photosensitive material such as color photographic paper. To direct light toward the sensor, it is known to use a movable mirror having a total reflecting surface, and to move the mirror into and out of the light path.

However, the mirror must be inserted into and removed from the printing light path before printing each frame. Therefore, it is hard to print quickly, and it is difficult to position the mirror very accurately. In addition, in an inverted type of photographic printer in which the photographic film is placed in the lower portion and the photographic paper is placed in the upper portion, the mirror may disturb the handling of the photographic film because the mirror is placed near to and over a film carrier for the photographic film.

It also is known to dispose a beam splitter in stationary fashion in a printing light path. The beam splitter reflects part of the light passing through the photographic film and directs it toward the sensor. Although such a beam splitter makes it possible to make prints quickly, the beam splitter can make it inconvenient to exchange lenses, though it is necessary to use a specific lens according to frame size or print type. For example, when printing a Brownie film, a specific lens therefor is desirable: to make a package print, that is, a print bearing more than one image of the same subject, a so called lens cluster is indispensable.

Furthermore, in order to make a print of sufficiently high quality, it is necessary to accommodate not only the lens but also the beam splitter. However, for this purpose, conventional lenses are not applicable, and it is necessary to design new lenses especially therefor. Although it may be possible to use a single common beam splitter for all kinds of lenses, such a common beam splitter will be very large in size and therefore will be costly, and will remarkably lower the efficiency in printing 135 films. Because a 135 film is the most popular film, such a construction is not preferable.

SUMMARY OF THE INVENTION

The present invention has been made to solve the above described problems, and has as an object the provision of a photographic printer in which it is possible to detect light positively for light measurement or for imaging while maintaining the security of photographic films and achieving sufficiently high speed printing of a popular size of film such as 135 film. The printer should allow convenient interchanging of the lenses, have easy operation, and be capable of making high quality prints.

The above and other objects and advantages of the invention are accomplished by a photographic printer wherein a zoom lens fitted with a beam splitter is used for making 135-size prints and smaller frames as well, such as frames of a disc film, 110 film, and 126 film, while at least a fixed focus lens and a mirror are used for making such prints to which the zoom lens is not applicable, the mirror being movable into and out of a printing light path between the fixed focus lens and the film surface.

The invention takes advantage of the fact that the above-mentioned special print, such as the print of a Brownie film and a package print, is not necessarily performed at a high speed. As 135 films usually are the films printed most often, it is preferable to use a zoom lens for printing the 135-size and smaller frames without interchange, and to use a beam splitter disposed together with the zoom lens, by which a part of the light passing through a photographic film is reflected and measured for color correction or for monitoring. In this way, it becomes possible to make prints of images of 135-size or smaller frames (hereinafter referred to as small frames) surely at a high speed, because it is unnecessary to change the lens in accordance with the frame size, or to drive the mirror to move into and out of the printing light path.

On the other hand, when making a special print, an appropriate kind of fixed focus lens is set in the printing light path instead of the zoom lens and, at that time, the movable mirror is used for obtaining the measurement light. Since such special printing is not required as frequently, and since no beam splitter is disposed before the fixed focus lens, the interchange of the fixed focus lens is not troublesome, and also conventional fixed focus lenses may be used. Further, the printing light passing through the fixed focus lens cannot be interfered with by any beam splitter. Since the movable mirror does not need to move rapidly, the mirror can move in a stable manner.

As is known in the art, a mirror box used for printing small frames has a relatively small exit diameter, whereas a mirror box used for printing large frames of Brownie film has a large exit diameter. Therefore, the intensity of light from the mirror box for the Brownie film is lower than that from the mirror box for the small frames. However, according to the invention, when printing small frames, the beam splitter reflects only a part (for example, 25%) of light passing through the film and directs it toward the sensors, while the mirror reflects approximately 100% of the light, passing through the film, toward the sensors for printing a Brownie film. Therefore, the difference in the light intensity because of the above difference of the mirror box does not have considerable influence on exposure time, nor on light measurement.

BRIEF DESCRIPTION OF THE DRAWINGS

Other objects and advantages of the present invention will become apparent from the following detailed description when read in connection with the accompanying drawings, wherein.

DETAILED DESCRIPTION OF THE PREFERRED EMBODIMENT

Figure 1:
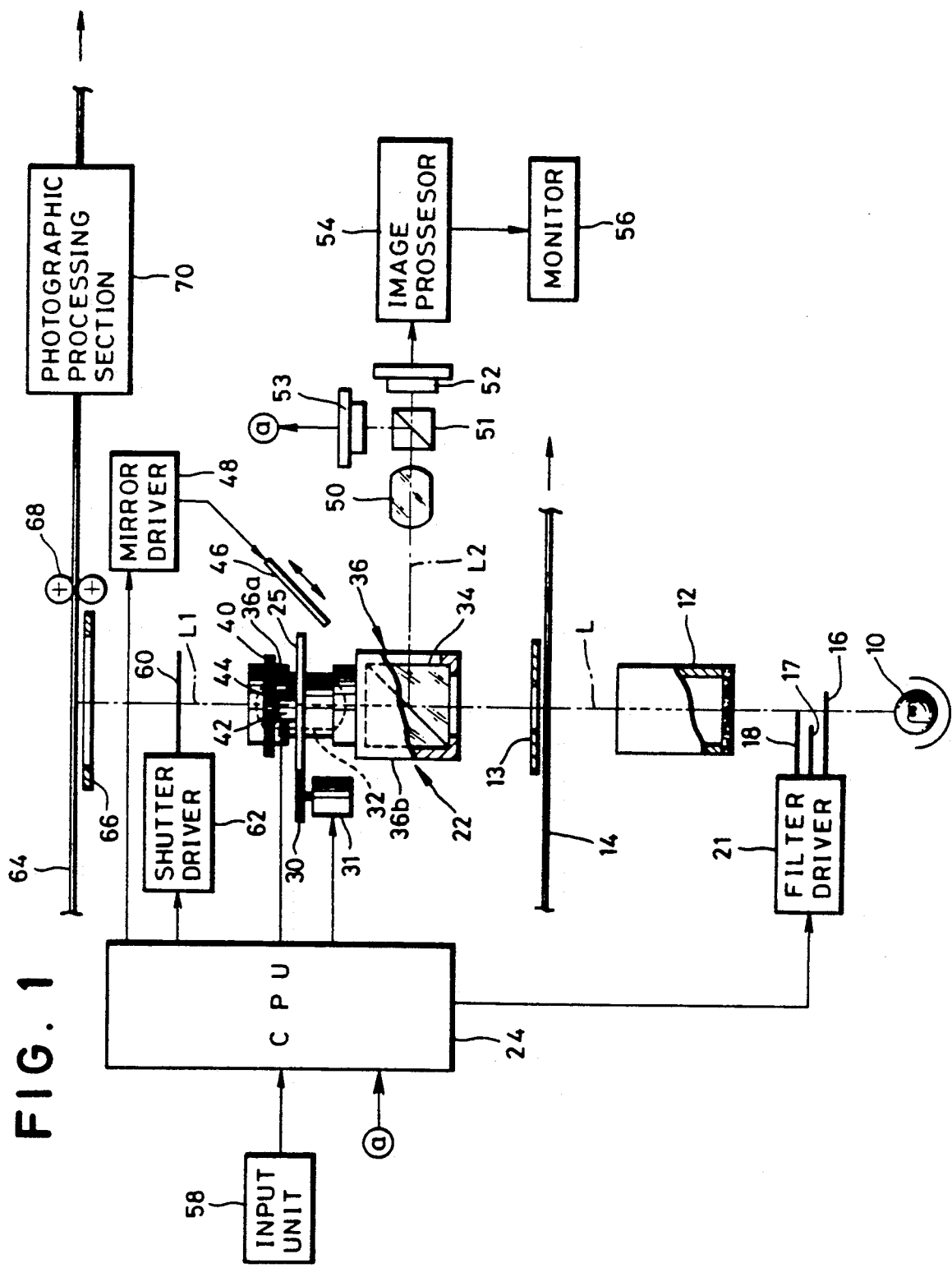
FIG. 1 is a schematic block diagram showing the overall construction of a photographic printer according to a preferred embodiment of the invention.

As shown in FIG. 1, light projected from a halogen lamp 10 is diffused sufficiently in a mirror box 12 and then illuminates a photographic film, for example a color negative film 14 set on a film carrier 13. Between the mirror box 12 and the lamp 10, there are respective cyan, magenta and yellow filters 16, 17, and 18 for compensating red, green and blue color components of light. These color compensating filters 16–18 are controlled independently by a filter driver 21 so as to be inserted into and out of the light path L in accordance with a control signal supplied from a central processing unit (CPU) 24.

Figure 2:
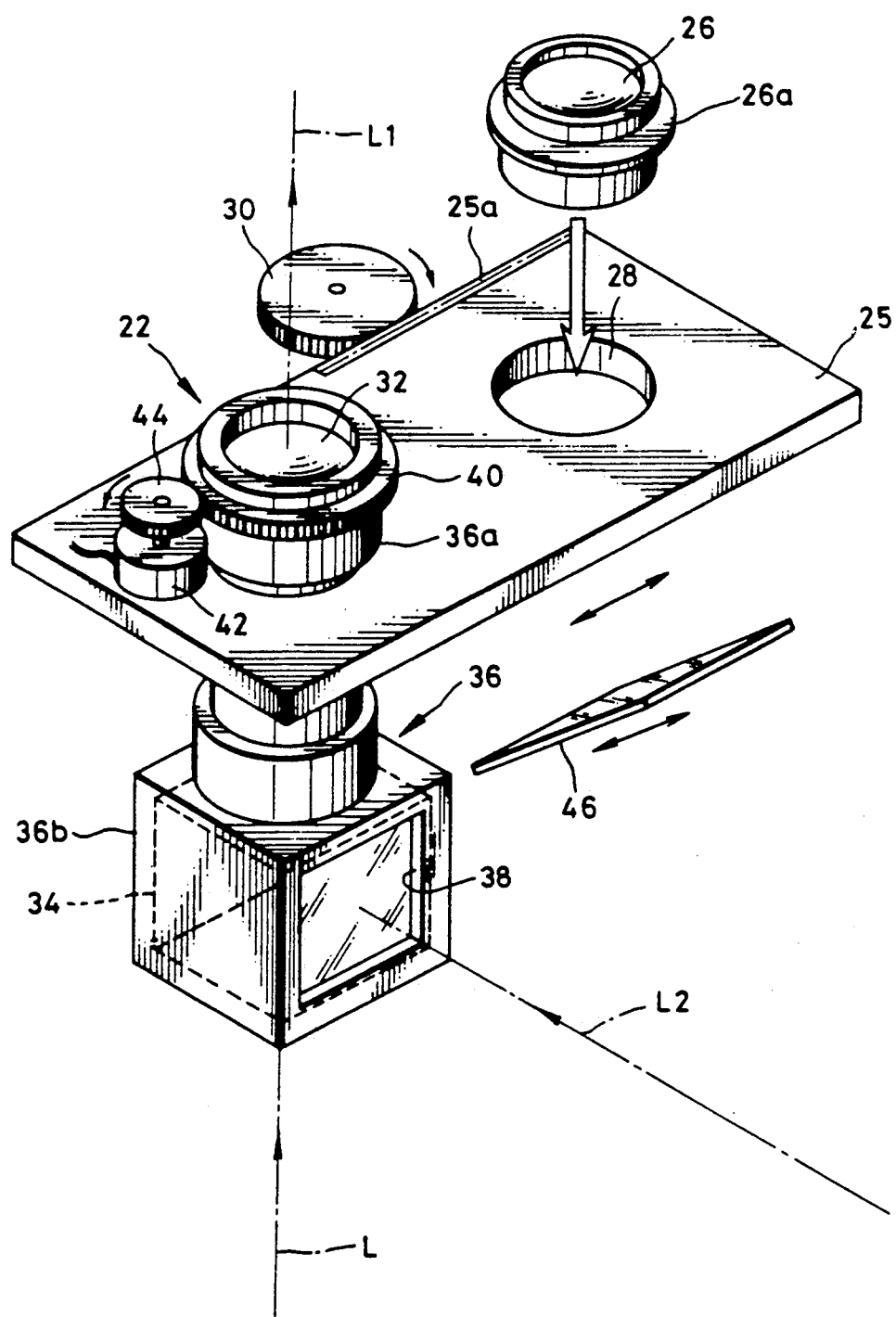
FIG. 2 is a perspective view showing essential parts of the printer of FIG. 1.

A lens panel 25, to which a zoom lens unit 22 is fitted, is disposed above the color negative film 14. As shown in FIG. 2, the lens panel 25 further is formed with an opening 28 into which a fixed focus lens for specific printing, for example, a lens system 26 for Brownie film (hereinafter referred to as a Brownie lens) can be inserted removably. Any one of a number of other specific lenses, such as a lens cluster, also can be inserted into the opening 28. The Brownie lens 26 for Brownie film has a lens barrel formed with a rim 26a which prevents the Brownie lens 26 from falling through the opening 28.

At one edge of the lens panel 25, there is formed a rack 25a engaging with a pinion gear 30, through which a motor 31 drives the lens panel 25 to slide longitudinally so that either one of the zoom lens unit 22 or a fixed focus lens will be placed in the light path L.

The zoom lens unit 22 includes a zoom lens 32, a beam splitter 34, and a lens barrel 36. The lens barrel 36 has a first housing section 36a for supporting the zoom lens 32 and a second housing section 36b for supporting the beam splitter 34. The zoom lens 32 is used for printing small frames, including those of 135 film, disc film, 110 film and 120 film. The beam splitter 34 reflects a part of the light projected from the lamp 10 and entering the beam splitter 34 through the color negative film 14, and directs the reflected light perpendicularly to the optical axis of the light along a light path L2. The other part of the light is transmitted through the beam splitter 34 along a printing light path L1 toward the zoom lens 32. Therefore, L2 is a measurement light path. The second housing section 36b is formed in the bottom and side walls with openings 38 for passing light therethrough.

On the outer surface of the first housing section 36a, there is formed a gear ring 40 which engages a gear 44 which is coupled to a motor 42. In this way, zooming of the zoom lens 32 can be performed by rotating the motor 42. This motor 42 and the above mentioned motor 31 are controlled by the CPU 24.

A total reflection mirror 46 is disposed near the light path L and is driven by a mirror driver 48 to be inserted in and removed from the light path L. When inserted in the light path L. the mirror 46 reflects light passing through the color negative film 14 and directs it along the measurement light path L2.

Light reflected from the mirror 46 or the beam splitter 34 reaches another beam splitter 51 through a zoom lens 50. The beam splitter 51 divides the reflected light into two beams and directs the beams respectively toward an image sensor 52 for picking up the image and an image sensor 53 for light. The image sensor 52 outputs video signals according to the light received therein, and sends the video signals to an image processor 54. The video signals processed in the image process 54 then are sent to a monitor 56 for displaying a color video image, simulating an image to be printed on the color negative film 14 (hereinafter referred to as a negative image). The image sensor 53 measures the three color separation values of the negative image and sends them to the CPU 24, which then calculates the color correction value of the negative image based on the three color separation values and other parameters.

An input unit 58 is provided to input manually various instructions and data such as a print start signal, color correction values, density correction values, print size data, film data and so forth, to the CPU 24.

A shutter 60, disposed in the printing light path L1 above the lens panel 25, is driven by a shutter driver 62 to open for a predetermined time so as to expose the color photographic paper 64. The shutter driver 62 also is controlled by the CPU 24. A photographic processing section 70 has the exposed color paper 64 fed thereinto by a pair of feed rollers 68 for processing in a conventional manner.

Now, the operation of the above embodiment will be described.

First, an appropriate fixed focus lens, for example, the Brownie lens 26, is set in the opening 28 of the lens panel 25 in which the zoom lens unit 22 is mounted securely. Then, necessary printing data such as film data, paper data and print size, are inputted through the input unit 58.

When the operator inputs a frame size of the color negative film 14 not larger than 135-size (e.g., disc film, 110-size, 126-size. 135-size-), the CPU 24 drives the motor 31 to slide the lens panel 25 as to place the zoom lens unit 22 in the light path L, and the magnification of the zoom lens 32 is adjusted automatically according to the frame size. At that time, the Brownie lens 26 is placed out of the light path L, and the mirror 46 is retained in an initial position diagonally upwardly from the beam splitter 34.

In this condition, light projected from the lamp 10 passes through the color filters 16–18 placed in the light path L, and through the mirror box 12 and the color negative film 14 to enter the beam splitter 34 of the zoom lens unit 22. A part of the light reflected from the beam splitter 34 travels along the measurement light path L2 and enters the image sensors 52 and 53 through the zoom lens 50 and the beam splitter 51. The image sensor 52 picks up the negative image so as to display a color video image simulating a photographic print of the image on the monitor 56, whereas the output signals of the image sensor 53 are sent to the CPU 24 to calculate the print exposure for the three primary colors. Based on the calculated values, the color compensating filters 16–18 are controlled for color correction.

The operator observes the video image to judge whether the image is proper in density and color, and if density and color are not proper, the operator inputs correction data through the input unit 58. The CPU 24 controls the color filters 16–18 according to the manual correction data. When the video image is judged as proper, and the print start signal is inputted through the input unit 58, the shutter 60 is actuated to expose the color photographic paper 64, thereby printing thereon the image of the color negative film 14.

After printing each frame, the feed rollers 68 advance the color photographic paper 64 so as to place an unexposed part thereof in a print station behind a paper mask 66. At the same time, the rollers feed the exposed part into the photographic processing section 70.

In this way, when using the zoom lens 32 as the printing lens, the beam splitter 34 simultaneously directs a part of the light passing through the negative image toward the sensors, so that monitoring and printing can be carried out continuously and rapidly.

Meanwhile, in order to print a Brownie-sized negative, the operator selects a Brownie print mode through the input unit 58. The motor 31 then is driven to slide the lens panel 25 so as to place the Brownie lens 26 in the light path L. Thereafter, the mirror box 12 is replaced by another mirror box having a larger exit diameter. Upon inputting a monitor start signal through the input unit 58, the mirror driver 48 is actuated to position the movable mirror 46 in the light path L, and then the mirror 46 reflects light passing through an image of the film 14. The reflected light is received by the image sensors 52 and 53 through the zoom lens 50 and the beam splitter 51. Thereafter, the same color correction and monitoring process as above are carried out.

When the print start signal is inputted through the input unit 58, the mirror 46 is retracted from the light path L into its initial position, and immediately thereafter the shutter 60 is actuated to open the printing light path L1, thereby printing the first frame of the film 14 on the color photographic paper 64 through the Brownie lens 26. After printing the first frame, the mirror driver 48 again inserts the mirror 46 into the light path L, to enable measurement and monitoring of the next frame.

When all the frames of the Brownie film have been printed, and if the next film to be printed is of 135-size or smaller, the lens panel 25 is slid to position the zoom lens unit 22 in the light path L. Simultaneously, the mirror 46 is retracted from the light path L into its initial position. The mirror 46 is retained in its initial position until a new instruction is inputted to make a special print using a specific lens. Any specific lens other than the Brownie lens 26, for example a lens cluster, can be set easily in the opening 28 in the same manner as the Brownie lens 26, because, at that time, no element such as a beam splitter is disposed under the opening 28.

As described so far, in the inventive printer, a zoom lens and a beam splitter are used for printing 135-size and smaller frames which are printed frequently, while an interchangeable fixed focus lens and a movable mirror are used for making special prints. Accordingly, it becomes possible to print 135-size or other popular-size frames at a high speed, while maintaining a high quality of print for any frame size or print size by adopting a suitable lens and a suitable light measurement method.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A photographic printer comprising:
    a light source for projecting printing light toward a photographic film to print an image, recorded on said photographic film, on a photosensitive material;
    a beam splitter for reflecting a part of the printing light passing through said photographic film perpendicularly to the printing light path;
    sensor means for receiving said part of said printing light;
    a zoom lens, fitted to said beam splitter as a unit, for printing an image of a size equal to or smaller than a frame size of 135 film, said zoom lens being disposed between said beam splitter and said photosensitive material;
    at least one fixed focus lens for printing images of a size other than that equal to or smaller than said frame size of said 135 film;
    setting means for setting either one of said zoom lens or said at least one fixed focus lens in the printing light path between said photographic film and said photographic material;
    reflection means, removably insertable in the printing light path between said fixed focus lens and said photographic film when said fixed focus lens is set in the printing light path, for reflecting light perpendicularly to the printing light path toward said sensor means; and
    means for driving said reflection means to move in and out of said printing light path, when said at least one fixed focus lens is set in said printing light path.

2. A photographic printer as defined in claim 1, wherein said beam splitter is disposed between said photographic film and said zoom lens, and said photosensitive material is disposed above said photographic film.

3. A photographic printer as defined in claim 2, further comprising a lens panel for fixedly supporting said zoom lens and said beam splitter and for removably supporting said at least one fixed focus lens, said lens panel being slid by a motor to position either one of said zoom lens or said fixed focus lens in said printing light path.

4. A photographic printer as defined in claim 2, wherein said reflection means is retracted diagonally upwardly from said beam splitter and is moved diagonally into the printing light path in place of said beam splitter.

5. A photographic printer as defined in claim 4, wherein said reflection means comprises a total reflection mirror.

6. A photographic printer as defined in claim 5, wherein said fixed focus lens comprises a lens for printing a Brownie film.

7. A photographic printer as defined in claim 5, wherein said fixed focus lens comprises a lens cluster.

8. A photographic printer as defined in claim 1, wherein said sensor means comprises at least an image sensor for detecting video signals representative of a photographic image to be printed.

9. A photographic printer as defined in claim 8, further comprising a monitor for displaying a video image simulating a print of said photographic image based on said video signals.

10. A photographic printer as defined in claim 7, further comprising a monitor for displaying a video image simulating a print of a photographic image to be printed.

11. A photographic printer as defined in claim 2, wherein said at least one fixed focus lens comprises a plurality of fixed focus lenses, said lens panel removably supporting any one of said plurality of fixed focus lenses.

* * * * *